US012158806B1

(12) United States Patent
Tate et al.

(10) Patent No.: US 12,158,806 B1
(45) Date of Patent: Dec. 3, 2024

(54) EFFICIENT ESTIMATION OF THRESHOLD VOLTAGE DISTRIBUTIONS IN A NONVOLATILE MEMORY

(71) Applicant: APPLE INC., Cupertino, CA (US)

(72) Inventors: Yonathan Tate, Kfar Saba (IL); Amit Pinchas Aylon, Tel Aviv (IL)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/341,807

(22) Filed: Jun. 27, 2023

(51) Int. Cl.
G06F 11/10 (2006.01)
G06F 17/11 (2006.01)

(52) U.S. Cl.
CPC .......... *G06F 11/1044* (2013.01); *G06F 17/11* (2013.01)

(58) Field of Classification Search
None
See application file for complete search history.

(56) References Cited

U.S. PATENT DOCUMENTS

| | | |
|---|---|---|
| 7,133,853 B2 | 11/2006 | Richardson et al. |
| 8,099,652 B1 | 1/2012 | Alrod et al. |
| 8,429,498 B1 | 4/2013 | Anholt et al. |
| 8,572,443 B2 | 10/2013 | Hetzler et al. |
| 8,689,084 B1 | 4/2014 | Tai |
| 8,854,880 B2 | 10/2014 | Chen et al. |
| 9,043,659 B2 | 5/2015 | Herrero Abellanas |
| 9,483,347 B2 | 11/2016 | Wu et al. |
| 9,489,257 B2 | 11/2016 | Ish-Shalom et al. |
| 9,490,023 B2 | 11/2016 | Sommer et al. |
| 9,542,258 B1 * | 1/2017 | Lu .................. G06F 11/0793 |
| 9,761,325 B1 * | 9/2017 | Shi .................. G11C 29/021 |
| 10,340,951 B2 | 7/2019 | Symons et al. |
| 10,388,394 B2 | 8/2019 | Tate et al. |
| 10,614,897 B1 * | 4/2020 | Steiner ............... G11C 16/0483 |
| 10,884,855 B1 | 1/2021 | Yazovitsky et al. |
| 10,929,221 B2 | 2/2021 | Haratsch et al. |

(Continued)

OTHER PUBLICATIONS

Z. Fang, Z. Ma, X. Tang, Y. Xiao and Y. Tang, "Program error mitigation in MLC NAND flash memory with soft decision decoders," in China Communications, vol. 18, No. 4, pp. 76-87, Apr. 2021, (Year: 2021).*

(Continued)

*Primary Examiner* — Daniel F. McMahon
(74) *Attorney, Agent, or Firm* — MEITAR PATENTS LTD.

(57) ABSTRACT

A controller includes an interface and a processor. The interface communicates with memory cells. The processor reads a Code Word (CW) from the memory cells using read thresholds to produce respective readouts, the read thresholds defining zones, identifies a subgroup of the memory cells associated with zones positioned about a Read Voltage (RV) predetermined between adjacent first and second Programming Voltages (PVs), estimates for each zone, based on the readouts, first and second cumulative counts of the memory cells corresponding to the first and second PVs, models first and second PDFs associated respectively with the memory cells programmed to the first and second PVs, based on the first and second cumulative counts, calculates for the zones respective reliability measures, based on the first and second PDFs, and assigns the reliability measures to bits of the CW, and decodes the CW by applying soft decoding to the assigned reliability measures.

16 Claims, 4 Drawing Sheets

(56) References Cited

U.S. PATENT DOCUMENTS

| | | |
|---|---|---|
| 11,205,498 B1 | 12/2021 | Berman et al. |
| 2003/0184457 A1 | 10/2003 | Hsiun |
| 2006/0291322 A1 | 12/2006 | Crippa et al. |
| 2008/0313493 A1 | 12/2008 | Roohparvar et al. |
| 2009/0168543 A1* | 7/2009 | Kim .................. G11C 16/3404 365/185.29 |
| 2009/0244973 A1* | 10/2009 | Scheppler ........... G06F 12/0246 365/185.21 |
| 2011/0038212 A1 | 2/2011 | Uchikwa et al. |
| 2011/0051521 A1* | 3/2011 | Levy ...................... G11C 16/10 365/185.24 |
| 2011/0066902 A1 | 3/2011 | Sharon et al. |
| 2012/0151247 A1 | 6/2012 | Ferraiolo et al. |
| 2012/0236648 A1* | 9/2012 | Liska ................. G11C 16/0483 365/185.18 |
| 2013/0159766 A1 | 6/2013 | D'Abreu et al. |
| 2013/0326284 A1 | 12/2013 | Losh et al. |
| 2014/0056066 A1* | 2/2014 | Baum ................. G11C 11/5642 365/185.03 |
| 2014/0157086 A1 | 6/2014 | Sharon et al. |
| 2014/0223260 A1 | 8/2014 | Asadi et al. |
| 2014/0281800 A1 | 9/2014 | Micheloni et al. |
| 2015/0364189 A1 | 12/2015 | Mittelholzer et al. |
| 2015/0364202 A1 | 12/2015 | Karakulak et al. |
| 2017/0212801 A1 | 7/2017 | Tai et al. |
| 2018/0349044 A1 | 12/2018 | Baum et al. |
| 2019/0056981 A1* | 2/2019 | Shulkin .................. G06F 11/073 |
| 2019/0056994 A1* | 2/2019 | Shulkin ............... G06F 11/1068 |
| 2022/0068401 A1* | 3/2022 | Bhatia ................ G11C 16/0483 |
| 2022/0336039 A1* | 10/2022 | Zhang .................. G11C 29/021 |
| 2023/0012648 A1* | 1/2023 | Fitzpatrick ......... G11C 16/3404 |
| 2023/0052685 A1 | 2/2023 | Tate et al. |

OTHER PUBLICATIONS

H. Li, "Modeling of Threshold Voltage Distribution in NAND Flash Memory: A Monte Carlo Method," in IEEE Transactions on Electron Devices, vol. 63, No. 9, pp. 3527-3532, Sep. 2016, (Year: 2016).*

Luo et al., "Architectural Techniques for Improving NAND Flash Memory Reliability", CMU-CS-18-101, Thesis submitted in partial fulfillment of the requirements for the degree of Doctor of Philosophy, School of Computer Science, Carnegie Mellon University, pp. 1-263, Aug. 12, 2018.

Luo et al., "Improving 3D NAND Flash Memory Lifetime by Tolerating Early Retention Loss and Process Variation", ACM on Measurement and Analysis of Computing Systems, vol. 2, issue 3, pp. 1-48, Dec. 2018.

U.S. Appl. No. 17/399,081 Office Action dated Aug. 3, 2023.

* cited by examiner

EFFICIENT ESTIMATION OF THRESHOLD VOLTAGE DISTRIBUTIONS IN A NONVOLATILE MEMORY

TECHNICAL FIELD

Embodiments described herein relate generally to data storage, and particularly to methods and systems for efficient estimation of threshold voltage distributions in a nonvolatile memory.

BACKGROUND

In various storage systems data is stored encoded in memory and decoded upon reading. For high decoding performance, a soft decoding scheme may be used, by assigning reliability measures to the data bits. The reliability measures may be derived from estimated threshold voltage distributions of the memory cells.

Methods for deriving reliability measures are known in the art. For example, U.S. Pat. No. 10,884,855 describes a storage device that includes circuitry and memory cells that store data in Np programming levels of threshold voltage values. The circuitry defines NRv threshold-sets, each includes Ns read thresholds that define Ns+1 zones, produces Ns readouts by reading, from a target WL, using the NS read thresholds, a target page that was stored encoded using an Error Correction Code (ECC), and produces a reference readout by reading the target page using optimal read thresholds. The circuitry identifies Np programming levels of memory cells in a neighbor WL for classifying target cells in the target WL into Np·NRv cell-groups. The circuitry calculates, per zone, Np LLR values, for the respective Np programming levels, based on the reference readout, the Ns readouts and the classification, assigns the LLR values to the target cells, and recovers the target page by applying to the assigned LLR values soft decoding for decoding the ECC.

SUMMARY

An embodiment that is described herein provides a memory controller that includes an interface and a processor. The interface is configured to communicate with a plurality of memory cells storing respective Threshold Voltages (TVs). The processor is configured to read a Code Word (CW) of an Error Correction Code (ECC) from a group of the memory cells using multiple read thresholds to produce multiple readouts, the read thresholds defining multiple zones of the TVs, to identify a subgroup of the memory cells in the group associated with (i) a Read Voltage (RV) predetermined between adjacent first and second Programming Voltages (PVs), and (ii) multiple zones positioned about the RV, to estimate for each of the multiple zones, based at least on the readouts, a first cumulative count of the memory cells in the subgroup corresponding to the first PV, and a second cumulative count of the memory cells in the subgroup corresponding to the second PV, to model first and second Probability Distributions Functions (PDFs) associated respectively with the memory cells in the subgroup programmed to the first and second PVs, based on at least some of the first and second cumulative counts, to calculate for the multiple zones respective reliability measures, based on the modeled first and second PDFs and assign the reliability measures to bits of the CW, and to decode the ECC of the CW by applying soft decoding to the assigned reliability measures.

In some embodiments, the processor is configured to apply an inverse cumulative function of a normalized PDF of the modeled first and second PDFs, to the first cumulative counts, to create a set of multiple equations in which parameters of the first PDF serve as unknown variables, and to estimate the parameters of the first PDF by solving the set of equations. In other embodiments, the processor is configured to solve at least some of the equations in the set of equations, directly. In yet other embodiments, the first PDF includes a Gaussian PDF, and the processor is configured to select two equations from among the set of equations, and to explicitly estimate a mean value parameter and a standard deviation parameter of the Gaussian PDF by solving the selected two equations.

In an embodiment, the processor is configured to solve the set of multiple equations by defining a Least Squares (LS) cost function that depends on the inverse cumulative function, applied to the first cumulative counts. In another embodiment, the processor is configured to detect an anomaly in first cell counts from which the first cumulative counts are derived, the anomaly makes a solution of the set of equations invalid, or makes the set of equations unsolvable, and to process the first cell counts to resolve the anomaly. In yet another embodiment, the processor is configured to divide the memory cells in the multiple zones into multiple subsets per zone depending on respective ranges of threshold voltages to which neighboring memory cells belong, to model PDF pairs based on cumulative cell counts per subset, and to calculate reliability levels per subset using the modeled PDF pairs.

In some embodiments, the processor is configured to identify in the group of the memory cells, indices corresponding to the memory cells in a given zone, to evaluate for the given zone first and second cell counts by respectively evaluating, in the identified indices of a base CW, a first number of '0' valued bits and a second number of '1' valued bits, and to calculate the first and second cumulative counts for the given zone based at least on the first and second cell counts.

There is additionally provided, in accordance with an embodiment that is described herein, a method for data storage, including, in a memory controller that communicates with a plurality of memory cells storing respective Threshold Voltages (TVs), reading a Code Word (CW) of an Error Correction Code (ECC) from a group of the memory cells using multiple read thresholds to produce multiple readouts, the read thresholds defining multiple zones of the TVs. A subgroup of the memory cells in the group associated with (i) a Read Voltage (RV) predetermined between adjacent first and second Programming Voltages (PVs), and (ii) multiple zones positioned about the RV, is identified. For each of the multiple zones, a first cumulative count of the memory cells in the subgroup corresponding to the first PV, and a second cumulative count of the memory cells in the subgroup corresponding to the second PV are estimated, based at least on the readouts. First and second Probability Distribution Functions (PDFs) associated respectively with the memory cells in the subgroup programmed to the first and second PVs are modeled, based on at least some of the first and second cumulative counts. For the multiple zones, respective reliability measures are calculated, based on the modeled first and second PDFs, and the reliability measures are assigned to bits of the CW. The ECC of the CW is decoded by applying soft decoding to the assigned reliability measures.

DETAILED DESCRIPTION OF EMBODIMENTS

Overview

Embodiments that are described herein provide methods and systems for efficient low-latency modelling of Threshold Voltage Distributions (TVDs) of 41 memory cells. The TVDs are modeled using Probability Distribution Functions (PDFs) that may be used for deriving reliability measures for soft decoding.

A nonvolatile memory typically stores data in memory cells by programing each memory cell to one of multiple predefined nominal Programming Voltages (PVs). The actual Threshold Voltages (TVs) of the memory cells programmed to a given PV are typically distributed in accordance with some Threshold Voltage Distribution (TVD). A memory cell whose TV falls in a range in which two adjacent TVDs overlap one another may be read erroneously.

The TVDs may vary over time due to various causes such as, for example, varying operational conditions, aging, disturbances, retention and repeated program and erase cycles. Such TVD variations typically result in increased read error rate.

Data is typically stored in the memory cells encoded using an Error Correction Code (ECC). The encoded data is also referred to as a Code Word (CW) of the ECC. A CW retrieved from the memory cells may be error free or contain one or more errors. In adverse conditions, soft decoding may be applied by assigning reliability measures to bits of the read CW (or to corresponding memory cells).

In the disclosed embodiments, reliability measures are derived from PDFs modelling the TVDs of the memory cells. A model PDF is determined by calculating cumulative counts of the memory cells in respective zones and finding parameters of the PDF for which the cumulative counts best fit a Cumulative Distribution function of the underlying PDF. By modeling the PDFs indirectly via the CDFs, the PDFs can be estimated by creating a set of equations that are solvable directly, without the need for exhaustive search over a grid of parameter values.

Consider a memory controller that includes an interface and a processor. The interface communicates with a plurality of memory cells storing respective TVs. The processor is configured to read a CW of an ECC from a group of the memory cells using multiple read thresholds to produce multiple readouts, the read thresholds defining multiple zones of the TVs. The processor is further configured to identify a subgroup of the memory cells in the group associated with (i) a Read Voltage (RV) predetermined between adjacent first and second PVs, and (ii) multiple zones positioned about the RV, to estimate for each of the multiple zones, based on at least the readouts, a first cumulative count of the memory cells in the subgroup corresponding to the first PV, and a second cumulative count of the memory cells in the subgroup corresponding to the second PV, to model first and second PDFs associated respectively with the memory cells in the subgroup programmed to the first and second PVs, based on at least some of the first and second cumulative counts, to calculate for the multiple zones respective reliability measures, based on the modeled first and second TVDs and assign the reliability measures to bits of the CW, and to decode the ECC of the CW by applying soft decoding to the assigned reliability measures.

In some embodiments, the processor applies an inverse cumulative function of a normalized PDF of the modeled first and second PDFs, to the first cumulative counts, to create a set of multiple equations in which parameters of the first PDF serve as unknown variables and estimates the parameters of the first PDF by solving the set of equations. The processor may solve at least some of the equations in the set of equations, directly.

In some embodiments, the first PDF comprises a Gaussian PDF, and the processor selects two equations from among the set of equations, and explicitly estimates a mean value parameter and a standard deviation parameter of the Gaussian PDF by solving the selected two equations.

In one embodiment, the processor solves the set of multiple equations by defining a Least Squares (LS) cost function that depends on the inverse cumulative function, applied to the first cumulative counts.

In some embodiments, the processor detects an anomaly t cell counts from which the first cumulative counts are derived, the anomaly makes a solution of the set of equations invalid, or makes the set of equations unsolvable. In such embodiments, the processor processes the first cell counts to resolve the anomaly.

In some embodiments, the processor estimates reliability levels at a resolution finer than per zone. In these embodiments, the processor divides the memory cells in the multiple zones into multiple subsets per zone, depending on respective ranges of threshold voltages to which neighboring memory cells belong. The processor models PDF pairs based on cumulative cell counts per subset and calculates reliability levels per subset using the modeled PDF pairs.

To calculate cumulative cell counts, the processor may apply the following procedure: identify in the group of the memory cells, indices corresponding to the memory cells in a given zone, evaluate for the given zone first and second cell counts by respectively evaluating, in the identified indices of a base CW, a first number of '0' valued bits and a second number of '1' valued bits, and calculate the first and second cumulative counts for the given zone based at least on the first and second cell counts.

In the disclosed embodiments, PDFs modeling TVDs of memory cells programmed to adjacent PVs are estimated by fitting CDFs to cumulative counts of memory cells in zones of the TVs. This indirect fitting is carried out by creating a set of equations that are solvable directly, rather than iteratively or by searching over a parameter grid. Consequently, the modeled PDFs can be estimated efficiently, reducing latency and power consumption considerably, which in turn improves user experience.

System Description

Figure 1:
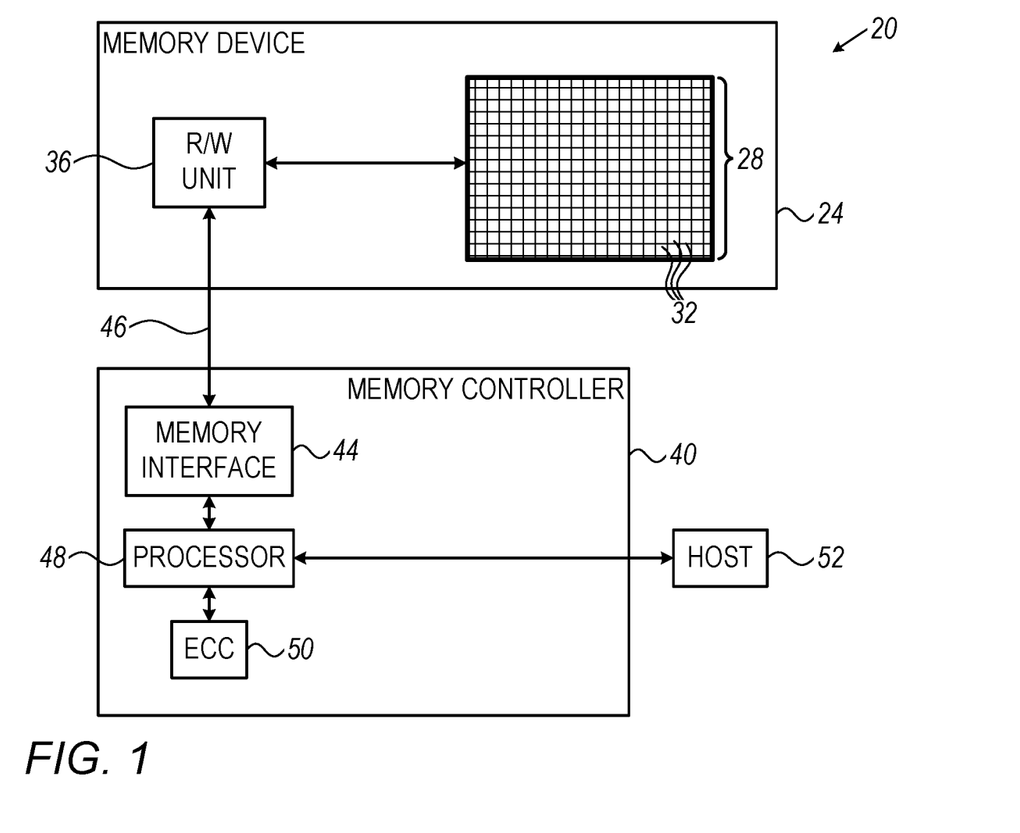
FIG. 1 is a block diagram that schematically illustrates a memory system, in accordance with an embodiment that is described herein.

FIG. 1 is block diagram that schematically illustrates a memory system 20, in accordance with an embodiment that is described herein. Memory system 20 can be used in various host systems and devices, such as in computing devices, cellular phones or other communication terminals, removable memory modules, Solid State Disks (SSD), Secure Digital (SD) cards, Multi-Media Cards (MMC) and embedded MMC (eMMC), digital cameras, music and other media players and/or any other system or device in which data is stored and retrieved.

Memory system 20 includes a memory device 24, which stores data in a memory array 28 that includes multiple memory cells 32, such as analog memory cells. In the context of the present patent application, the term "analog memory cell" is used to describe any memory cell that holds a continuous, analog value of a physical parameter, such as an electrical voltage or charge. Memory array 28 may include solid-state memory cells 32 of any kind, such as, for example, NAND, NOR and Charge Trap Flash (CTF) Flash cells, phase change RAM (PRAM, also referred to as Phase Change Memory-PCM), Nitride Read Only Memory (NROM), Ferroelectric RAM (FRAM) or Resistive RAM (RRAM). Although the embodiments described herein refer mainly to analog memory, the disclosed techniques may also be used with various other memory types.

The charge levels stored in the memory cells and/or the analog voltages or currents written into and read out of the memory cells are referred to herein collectively as analog values, storage values or analog storage values. Although the embodiments described herein mainly address threshold voltages, the methods and systems described herein may be used with any other suitable kind of storage values.

It is noted that in the description that follows, the terms "analog values" and "threshold voltages" are used interchangeably.

Memory system 20 stores data in memory cells 32 by programming the memory cells to assume respective memory states, which are also referred to as programming levels. The programming levels are selected from a finite set of possible levels, and each programming level corresponds to a certain nominal storage value, also referred to herein as a Programming Voltage (PV). For example, a 2 bit/cell Multi-Level Cell (MLC) can be programmed to assume one of four possible programming levels by writing one of four possible nominal storage values into the cell. Similarly, a 3 bit/cell MLC, also referred to as a Triple-Level Cell (TLC), and a 4 bit/cell MLC, also referred to as a Quad-Level Cell (QLC) device can be respectively programmed to assume one of eight possible programming levels and one of sixteen programming levels. A memory cell that stores a single bit (i.e., using two programming levels) is also referred to as a Single-Level Cell (SLC).

Memory device 24 includes a reading/writing (R/W) module 36, which converts data for storage in the memory device to analog storage values and writes them into memory cells 32. In alternative embodiments, the R/W module does not perform the conversion, but is provided with voltage samples, i.e., with the storage values for storage in the cells. When reading data out of memory array 28, R/W module 36 converts the storage values of memory cells 32 into digital samples having an integer resolution of one or more bits. Data is typically written to and read from the memory cells in data units that are referred to as data pages (or simply pages, for brevity). For reading a data page, the R/W module typically sets one or more read thresholds, e.g., at about mid-points between adjacent nominal programming levels, and senses the threshold voltages of the memory cells relative to the read thresholds. The R/W module can also read the analog values of the memory cells in selected ranges or zones by setting the read thresholds to zone boundaries.

The storage and retrieval of data in and out of memory device 24 is performed by a memory controller 40. Memory controller 40 includes a memory interface 44 for communicating with memory device 24, a processor 48, and an Error Correction Code (ECC) module 50. The memory controller communicates with the memory device via memory interface 44 over a communication link 46. Communication link 46 may include any suitable link or communication bus, such as, for example, a PCIe bus. The disclosed techniques can be carried out by memory controller 40, by R/W module 36, or both. Thus, in the present context, memory controller 40 and R/W module 36 are referred to collectively as storage circuitry that carries out the disclosed techniques.

Memory controller 40 communicates with a host 52, for accepting data for storage in the memory device and for outputting data retrieved from the memory device. In some embodiments, ECC module 50 encodes the data for storage using a suitable ECC and decodes the ECC of data retrieved from the memory. ECC module 50 may include any suitable type of ECC, such as, for example, Low Density Parity Check (LDPC), Reed-Solomon (RS) or Bose-Chaudhuri-Hocquenghem (BCH), can be used.

Data read from a group of memory cells may contain one or more errors. The number of errors typically increases when the read threshold used for sensing the memory cells is positioned non-optimally.

Memory controller 40 may be implemented in hardware, e.g., using one or more Application-Specific Integrated Circuits (ASICs) or Field-Programmable Gate Arrays (FPGAs). Alternatively, the memory controller may include a microprocessor that runs suitable software, or a combination of hardware and software elements.

The configuration of FIG. 1 is an example memory system configuration, which is shown purely for the sake of conceptual clarity. Any other suitable memory system configuration can also be used. For example, although the example of FIG. 1 shows a single memory device, in alternative embodiments memory controller 40 may control multiple memory devices 24, e.g., in a Redundant Array of Independent Disks (RAID) storage system. Elements that are not necessary for understanding the principles of the present disclosure, such as various interfaces, addressing circuits, timing and sequencing circuits and debugging circuits, have been omitted from the figure for clarity.

In the example memory system configuration shown in FIG. 1, memory device 24 and memory controller 40 are implemented as two separate Integrated Circuits (ICs). In alternative embodiments, however, the memory device and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which the memory array disposed. Further is alternatively, some or all of the functionality of memory controller 40 can be implemented in software and carried out by a processor or other element of the host system. In some embodiments, host 52 and memory controller 40 may be fabricated on the same die, or on separate dies in the same device package.

In some embodiments, processor 48 of memory controller 40 includes a general-purpose processor, which is programmed in software to carry out the functions described herein. The software may be downloaded to the processor in electronic form, a over network, for example, or it may, alternatively or additionally, be provided and/or stored on non-transitory tangible media, such as magnetic, optical, or electronic memory.

In an example configuration of memory array 28, memory cells 32 are arranged in multiple rows and columns, and each memory cell includes a floating-gate transistor. The gates of the transistors in each row are connected by word lines, and the sources of the transistors in each column are connected by bit lines. In the present context, the term "row" is used in the conventional sense to mean a group of memory cells that are fed by a common word line, and the term "column" means a group of memory cells fed by a common bit line. The terms "row" and "column" do not connote a certain physical orientation of the memory cells relative to the memory device. The memory array is typically divided into multiple memory pages, i.e., groups of memory cells that are programmed and read simultaneously.

In some embodiments, memory pages are sub-divided into sectors. Data pages may be mapped to word lines in various manners. Each word line may store one or more data pages. A given data page may be stored in all the memory cells of a word line, or in a subgroup of the memory cells (e.g., the odd-order or even-order memory cells). To access a specific word line or data page, the memory device is provided with a respective physical address.

Erasing of the memory cells in memory array 28 is usually carried out in blocks that contain multiple memory pages. Typical memory devices may include thousands of erasure blocks (also referred to as "memory blocks"). In a typical two-dimensional (2D) two-bit-per-cell MLC device, each erasure block is on the order of 128 word lines, each including several tens of thousands of memory cells. Two-bit-per-cell devices having 128 word lines per erasure block that store a data page per bit significance value would have 256 data pages per erasure block, and three-bit-per-cell devices would have 394 data pages per block. A typical three-dimensional (3D) device that stores three bits per cell may include, for example, 4 sections per block, wherein each section includes several thousand strings that each includes 48 layers of cell columns. Such a 3D device has 12 data pages per a physical word line, or 576 data pages per an erasure block. Alternatively, other block sizes and configurations can also be used.

Soft Decoding Using Reliability Measures

Figure 2:
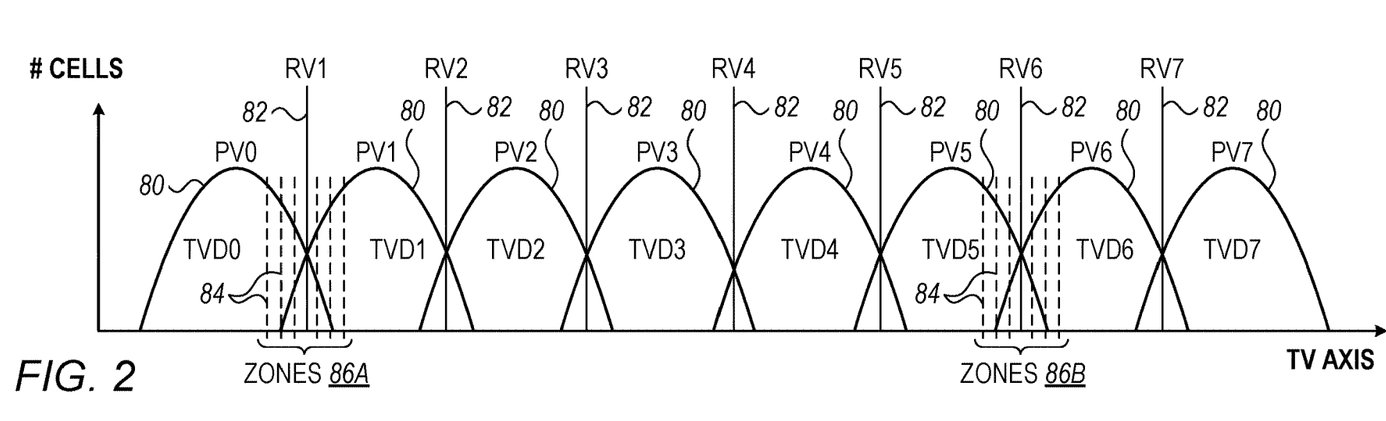
FIG. 2 is a diagram that schematically illustrates Threshold Voltage Distributions (TVDs) of TLC memory cells, in accordance with an embodiment that is described herein.

FIG. 2 is a diagram that schematically illustrates Threshold Voltage Distributions (TVDs) of TLC memory cells, in accordance with an embodiment that is described herein.

In a TLC device, the memory controller programs the memory cells in eight predefined nominal PVs denoted PV0 . . . PV7. (PV0 is sometimes referred to as an erasure PV). As depicted in the figure, memory cells programmed to each PV are distributed in accordance with a respective TVD 80. In the present example, the TVDs are denoted TVD0 . . . TVD7 corresponding to the eight PVs, PV0 . . . PV7. In TLC, data is stored in three different page-types: a Least Significant Bit (LSB) page, a Most Significant Bit (MSB) page and an Upper Significant Bit (USB) page. In this case, each PV encodes a combination of three bits belonging to the three page-types, respectively.

Read Voltages (RVs) 82, denoted RV1 . . . . RV7, are positioned at about midpoints between adjacent PVs. The RVs may be set to optimal (or close to optimal) positions along the TV axis for minimizing readout errors. In reading a given page type, the memory controller reads a group of memory cells using one or more read thresholds positioned in the vicinities of one or more respective RVs. In the example of FIG. 2, the memory controller reads a single page using two read thresholds, associated with RV1 and RV6.

In some embodiments, the memory controller retrieves a CW of ECC 50 from a group of the memory cells and decodes the CW using a soft decoding scheme that requires assigning reliability measures to the CW bits (or to corresponding memory cells). To this end, the memory controller reads the CW from the group of memory cells multiple times using multiple read thresholds 84, defining multiple zones of the TVs. In the example of FIG. 2, the memory controller reads the CW seven times using pairs of read thresholds, one from RV1 and another from RV6. Read thresholds 84 define six inner zones 86A positioned about RV1 and other six inner zones 86B positioned about RV6. The memory controller calculates reliability measures per zone and assigns the reliability measures of a zone to the CW bits of memory cells whose TVs fall in that zone. It is noted that the reliability measures may be affected by TVs of neighbor memory cells (e.g., in adjacent upper and lower WLs). In some embodiments, in assigning reliability measures to the zones, the memory controller identifies memory cells associated with a given RV, by reading one or more separator pages using other RVs that are used for reading pages of bit significance values other than the bit significance value of the underlying CW. In some embodiments, the memory controller calculates reliability measures for the zones by modeling a pair of adjacent TVDs, e.g., model PDFs of TVD0 and TVD1 for RV1, and model PDFs of TV5 and TV6 for RV6. Based on the modeled PDFs, the memory controller derives a reliability measure per zone. The reliability measures may comprise, for example, Log Likelihood Ratio (LLR) reliability measures, or any other type of reliability measure.

The TLC TVDs of FIG. 2 are given by way of example, and other TVDs can also be used. For example, TVDs of SLC, MLC or QLC memory cells could be used, with corresponding numbers of TVs and RV settings for reading respective page types.

Efficient Modeling of TVDS

Figure 3:
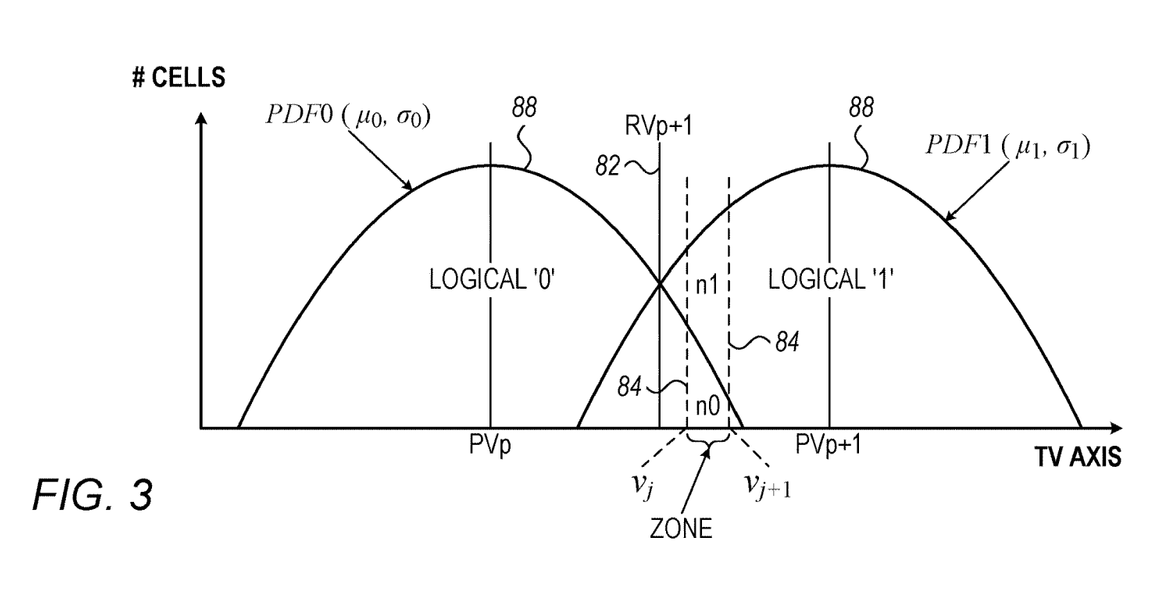
FIG. 3 is a diagram that schematically illustrates a pair of Probability Density Functions (PDFs) modeling the TVDs of memory cells programmed to adjacent PVs, in accordance with an embodiment that is described herein.

FIG. 3 is a diagram that schematically illustrates a pair of Probability Density Functions (PDFs) modeling the TVDs of memory cells programmed to adjacent PVs, in accordance with an embodiment that is described herein.

In the present example, adjacent PDFs 88 denoted PDF0 and PDF1, model TVDs of memory cells that were programmed to adjacent PVs denoted PVp and PVp+1 (for a number P of PVs, 'p' denotes the PV index between 0 and P−1). It is assumed that with the bit significance value of the underlying CW, PVp and PVp+1 represent memory cells programmed to respective logical values '0' and '1'. Alternatively, the roles of the logical '0' and logical '1' values can be switched.

In the present example, the TVDs of memory cells programmed to PVp and PVp+1 are modeled using Gaussian PDFs denoted PDF0 and PDF1, having mean and standard deviation parameters denoted ($\mu_0$, $\sigma_0$) and ($\mu_1$, $\sigma_1$), respectively.

As noted above, the memory controller identifies memory cells in zones positioned about an RV used for retrieving the CW. FIG. 3 depicts one of the zones that contains memory cells whose TVs fall between voltages $v_j$ and $v_{j+1}$ along the TV axis, wherein 'j' denotes the zone index. For example, when using a number 'K' of read thresholds about each RV, the zone index gets integer numbers in the range j=1 . . . . K−1.

In FIG. 3, "n0" denotes the number of memory cells in the zone that were programmed to PVp (logical '0'), and "n1" denotes the number of memory cells in the zone that were programmed to PVp+1 (logical '1'). The sum (n0+n1) denotes the total number of cells whose TVs fall in that zone.

As will be described in detail below, the memory controller calculates cumulative counts of n0 values over one or more zones for determining PDF0. Similarly, the memory controller calculates cumulative counts of n1 values over the zones for determining PDF1.

In some embodiments, the memory controller separates between n0 and n1 in a zone using a base CW. Specifically, the memory controller calculates the cell counts n0 and n1 in each zone by counting the number of '0' bits and '1' bits in the base CW. The base CW may be generated, for example, by reading the memory cells using the relevant RV (s). Alternatively, when applying iterative decoding, the base CW may be provided by a previous decoding iteration as a decoded CW that still contains one or more errors. The $i^{th}$ bit of the base CW is denoted $b_i \in \{0,1\}$.

Let Ig denote the locations of the memory cells related to RVp+1 and let $I_j$ denote the indices of the memory cells falling in the $j^{th}$ zone.

In an embodiment, the memory controller estimates n0 in the $j^{th}$ zone by counting the number of '0' bits in the base CW as given by:

$$n0_j = \sum_{i \in I_g \cap I_j} 1 - b_i \quad \text{Equation 1}$$

Similarly, the memory controller estimates n1 in the $j^{th}$ zone by counting the number of '1' bits in the base CW as given by:

$$n1_j = \sum_{i \in I_g \cap I_j} b_i \quad \text{Equation 2}$$

The description below refers mainly to the estimation of PDF1, for the sake of clarity. The memory controller, however, applies similar calculations for estimating PDF0. For PDF1, it is assumed that the mid read threshold corresponding to the index j given by j=(1+K)/2, falls below the mean value of PDF1.

For Gaussian parameters $\mu_1$, $\sigma_1$, let $C1_j$ denote the expected number of memory cells in the $j^{th}$ zone, in accordance with the Gaussian model, as given by:

$$C1_j(\mu_1, \sigma_1) = \int_{v_j}^{v_{j+1}} \frac{N1}{\sqrt{2\pi\sigma_1^2}} e^{-\frac{(v-\mu_1)^2}{2\sigma_1^2}} \quad \text{Equation 3}$$

wherein N1 denotes the overall number of memory cells programmed to PVp+1. In some embodiments, the average value of N1 is used in all calculations, because the true value of N1 is typically unknown.

In some disclosed embodiments, the memory controller derives the Gaussian parameters by fitting cumulative counts of the cell counts $n1_j$ to a Cumulative Distribution Function (CDF) of the underlying PDF. Using the Gaussian model, the cumulative cell counts can be approximated as given by:

$$\frac{1}{N1}\sum_{j=1}^{k} n1_j \approx \int_{v_1}^{v_{j+1}} \frac{1}{\sqrt{2\pi\sigma_1^2}} e^{-\frac{(v-\mu_1)^2}{2\sigma_1^2}} = \Phi\left(\frac{v_{j+1}-\mu_1}{\sigma_1}\right) - \Phi\left(\frac{v_1-\mu_1}{\sigma_1}\right) \quad \text{Equation 4}$$

wherein $\Phi(\cdot)$ denotes a CDF corresponding to the normalized underlying Gaussian distribution.

For j=1 . . . . K−1, Equation 4 defines a set of K−1 equations, each specified by a different cumulative sum of the '1' cell counts.

Assuming the number of cells falling below $v_1$ is negligible compared to the number of cells falling above $v_1$, the approximation $$\Phi\left(\frac{v_1-\mu_1}{\sigma_1}\right) \approx 0$$

holds, and Equation 4 can be approximated as:

$$\frac{1}{N1}\sum_{j=1}^{k} n1_j \approx \Phi\left(\frac{v_{j+1}-\mu_1}{\sigma_1}\right) \quad \text{Equation 5}$$

For the sake of simplicity, let the variables $W_j$ and $Q_j$ be defined as:

$$W_j = \frac{1}{N1}\sum_{j=1}^{k} n1_j, Q_j = \Phi^{-1}(W_j) \quad \text{Equation 6}$$

Using the notations of Equation 6, the set of equations with two unknown variables ($\mu_1$, $\sigma_1$) (in Equation 5) is given by:

$$Q_j = \Phi^{-1}(W_j) = \frac{v_{j+1}-\mu_1}{\sigma_1}, j = 1 \ldots K-1 \quad \text{Equation 7}$$

Specifically, given the '1' cell counts $n1_j$, the memory controller calculates $W_j$ of Equation 6, and calculates the inverse cumulative function $\Phi^{-1}(W_j)$ of Equation 7 to derive $Q_j$ of Equation 7.

The set of K−1 equations in Equation 7 can be solved in various ways. In one embodiment, the memory controller selects two indices denoted j1 and j2 in the range 1 . . . K−1, to define a set of two equations with the two unknown variables ($\mu_1$, $\sigma_1$) as follows:

$$Q_{j1} = \frac{v_{j1+1}-\mu_1}{\sigma_1}, Q_{j2} = \frac{v_{j2+1}-\mu_1}{\sigma_1} \quad \text{Equation 8}$$

The memory controller solves Equation 8 directly to explicitly calculate the Gaussian parameters as given by:

$$\hat{\sigma}_1 = \frac{v_{j2+1} - v_{j1+1}}{Q_{j2} - Q_{j1}}$$
$$\hat{\mu}_1 = v_{j2+1} - Q_{j2}\hat{\sigma}_1$$

Equation 9

The indices j1 and j2 in Equations 8 and 9 can be selected in any suitable way. For example, for using all the available '1' counts (n1$_j$), the memory controller may select the two equations as given by:

$$j1 = K-2$$
$$j2 = K-1$$

Equation 10:

It is noted that for W$_j$ values far from the Gaussian peaks (e.g., in the tail region of $\Phi^{-1}$), the conversion from W$_j$ to Q$_j$ using $\Phi^{-1}$ is more sensitive to errors in W$_j$, and consequently the quality of the estimation may degrade. Therefore, in some embodiments, W$_j$ samples close to the Gaussian peak, for which W$_j$ are close 0.5 may be used with reduced sensitivity.

In an embodiment, the memory controller selects the two equations such that j1 and j2 are closest to $\mu_1$. In this embodiment, j1 and j2 may be identified by selecting the values of W$_j$ closest to 0.5 as explained above.

When using the Equations 8 and 9 above for Gaussian estimating PDF0, the mean value of the distribution is below the mid read threshold mentioned above. In this case, the memory controller may apply several modifications as follows:

1) Reverse the order of the indices of the cell counts n0$_j$.
2) Reverse the order of voltages v$_j$ and multiply the voltage values by (-1).
3) Perform calculations similar to those given in Equations 8 and 9 above, for estimating the parameters of PDF0.
4) Multiply the resulting mean value $\hat{\mu}_0$ by (-1).

In the estimation methods described above, the memory controller selects two equations with two unknown variables to find the two Gaussian parameters. Next is described a generalization that uses more than two equations, e.g., the full set of K-1 equations with two unknown variables. The full set of equations can be formulated as a Least Squares (LS) cost function that sums K-1 squared differences as given by:

$$C(\mu_1, \sigma_1) = \sum_{j=1}^{K-1} \left[ Q_j - \frac{v_{j+1} - \mu_1}{\sigma_1} \right]^2$$

Equation 11

By changing variables into x$_1$ and x$_2$:

$$x_1 = \frac{1}{\sigma_1}, \quad x_2 = \frac{\mu_1}{\sigma_1}$$

Equation 12 the differences in Equation 11 become linear, in which case the memory controller derives $\hat{x}_1$ and $\hat{x}_2$ that minimize the cost function directly, which is much more efficient than searching over a grid of the Gaussian parameters. Using $\hat{x}_1$ and $\hat{x}_2$, the memory controller calculates the Gaussian parameters based on Equation 12.

For the direct solution above, the following vectors may be defined as given by:

$$\underline{x} = \begin{bmatrix} x_1 \\ x_2 \end{bmatrix}, \underline{q} = \begin{bmatrix} Q_1 \\ \ldots \\ Q_{K-1} \end{bmatrix}, M = \begin{bmatrix} v_1 & 1 \\ \ldots & \ldots \\ v_K & 1 \end{bmatrix}$$

Equation 13 and the direct solution is given by:

$$\underline{\hat{x}} = (M^T M)^{-1} M^T \underline{q}$$

Equation 14:

In some embodiments, the memory controller assigns to the Q$_j$ values accuracy levels, e.g., depending on the amount of statistics used in calculating the Q$_j$ values. In these embodiments, the memory controller uses a variant cost function of Equation 11, e.g., a weighted LS cost function with the accuracy levels serving as weights.

Figure 4:
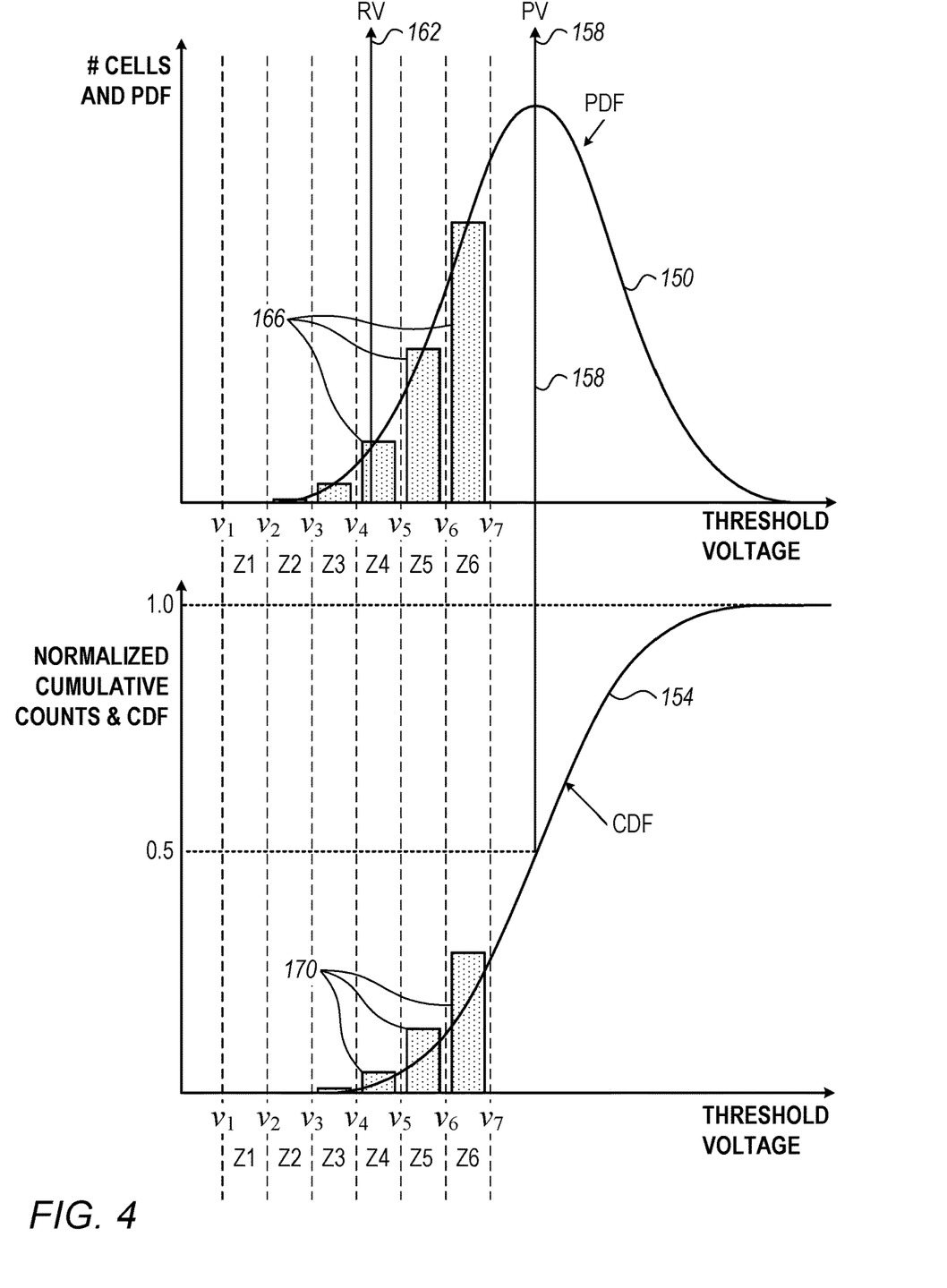
FIG. 4 is a diagram that schematically illustrates a Gaussian PDF modeling a TVD, and a corresponding normalized Gaussian Cumulative Distribution Function (CDF), in accordance with an embodiment that is described herein.

FIG. 4 is a diagram that schematically illustrates a Gaussian PDF 150 modeling a TVD, and a corresponding normalized Gaussian Cumulative Distribution Function (CDF) 154, in accordance with an embodiment that is described herein.

PDF 150 and CDF 154 correspond to memory cells that were programmed to a PV 158. FIG. 4 further depicts multiple zones denoted Z1 . . . . Z6, defined by read thresholds positioned at voltages v$_1$ . . . . v$_7$. The threshold voltages (and zones) are positioned about (e.g., below, and/or above) a predetermined RV 162.

A cell count 166 in zone Zj, denotes the number of memory cells in that zone that were programmed to PV 158. Cumulative cell counts 170 denote the (normalized) cumulative numbers of memory cells in the respective zones. For example, the cumulative count in zone Z5 equals the sum of the cell counts over the zones Z1 . . . . Z5. As described above, in some embodiments, the memory controller estimates the parameters of PDF 150 by fitting CDF 154 to cumulative cell counts 170. This approach results in estimating the parameters of the Gaussian PDF using a set of equations that are solvable using direct calculation, which is much more efficient than searching over a grid of discrete parameter values.

In some embodiments, the memory controller detects an anomaly in cell counts from which the first and second cumulative counts are derived. The anomaly makes a solution of the set of equations (given, e.g., in Equation 7 above) invalid or makes the set of equations unsolvable. In such embodiments the memory controller processes the cell counts to resolve the anomaly.

Next are described example anomalies that may be encountered. In one embodiment, a certain zone cannot be sampled because the zone falls outside a valid range of the TV axis. The memory controller removes such a zone and does not calculate a cumulative count that zone. In another embodiment, a portion of a zone falls in an invalid range of the TV axis. In this embodiment the memory controller combines the valid portion of the zone with a neighbor zone.

In yet another embodiment, the memory controller considers extreme values of the cumulative counts W$_j$ (Equation 6). For example, a W$_j$ value below 0.25 may indicate a tail of the Gaussian PDF in which case the PDF estimation may be inaccurate. As another example, when the values of the cell counts do not form a monotonically increasing sequence, which may not be well aligned with a Gaussian distribution. In such embodiments, the memory controller may manipulate the cell counts to produce a monotonic sequence, before estimating the PDF.

As another example, as noted above, a value of $W_j$ far above 0.5 may cause inaccurate result in applying the inverse cumulative function $\Phi^{-1}(W_j)$, because this inverse cumulative function is sensitive to errors in $W_j$ at this range. In this case, the memory controller may select two $W_j$ samples closest to 0.5. When no reliable PDF estimation is possible, the memory controller may use default predetermined Gaussian parameters.

A Method for Soft Decoding

Figure 5:
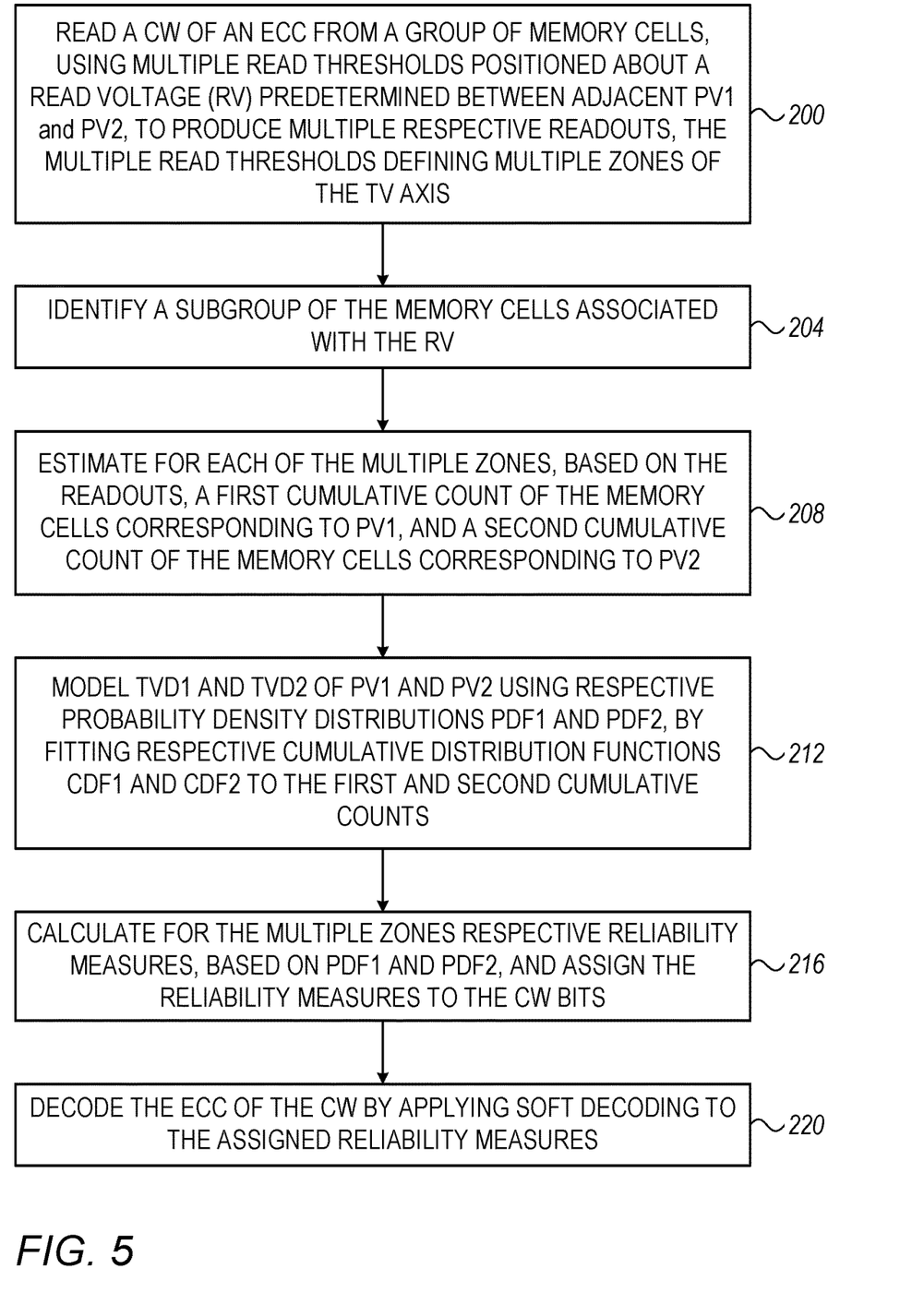
FIG. 5 is a flow chart that schematically illustrates a method for soft decoding based on fitting a CDF model to cumulative counts in zones of threshold voltages, in accordance an embodiment that is described herein.

FIG. 5 is a flow chart that schematically illustrates a method for soft decoding based on fitting a CDF model to cumulative counts in zones of threshold voltages, in accordance with an embodiment that is described herein. The method will be described as executed by elements of memory controller 40 of FIG. 1 above, e.g., processor 48 and ECC 50.

The method begins, at a reading step 200, with memory controller 40 reading a CW of ECC 50 from a group of memory cells 32, using multiple read thresholds positioned about a RV predetermined between adjacent PVs denoted herein PV1 and PV2, to produce multiple readouts. The multiple read thresholds define multiple zones of the TV axis. In general, reading the CW to produce a single readout may require setting two or more read thresholds in the vicinity of respective two or more RVs (including the RV of step 200). In this case, the memory controller separates between memory cells corresponding to the RV of step 200 and memory cells corresponding to other RVs by reading from the group of memory cells, one or more separator pages, e.g., pages of bit significance value other than that of the underlying CW. In the present method, at a RV separation step 204, the memory controller identifies a subgroup of the memory cells associated with the RV of step 200.

At a cumulative counts evaluation step 208, the memory controller estimates for each of the multiple zones, based on the readouts (and on a base CW, as described above), a first cumulative count of the memory cells corresponding to PV1, and a second cumulative count of the memory cells corresponding to PV2, as described above, e.g., with reference to FIGS. 3 and 4.

At a TVD modelling step 212, the memory controller models TVD1 and TVD2 of PV1 and PV2 using respective probability density distributions PDF1 and PDF2, by fitting respective cumulative distribution functions CDF1 and CDF2 to the first and second cumulative counts, as described above.

At a reliability measures calculation step 216 the memory controller calculates, based on PDF1 and PDF2, per-zone reliability measures, and assigns the reliability measures to the CW bits. At a decoding step 220, the memory controller decodes the ECC of the CW by applying soft decoding to the assigned reliability measures. Following step 220 the method terminates.

In the method of FIG. 4, the memory controller estimates two adjacent PDFs related to an RV. In case two or more read thresholds related to two or more RVs are required, the memory controller estimates two adjacent PDFs for each of the two or more RVs and calculates separate sets of reliability measures for the zones related to the respective two or more RVs.

The embodiments described above are given by way of example, and other suitable embodiments can also be used. For example, although in the embodiments above, reliability measures are assigned per zone, in alternative embodiments, for higher accuracy, the reliability measures may be assigned at a finer resolution. This is applicable, for example, when the memory cells from which the CW is read are disturbed by neighbor memory cells. The disturbance level typically depends on the PVs to which the neighbor memory cells are programmed. In some embodiments, the memory controller divides the memory cells in each zone into multiple subsets depending on respective ranges of threshold voltages to which neighboring memory cells belong, calculates respective subset reliability measures for the subsets, e.g., using techniques similar to those described above, here applied at the subset level. In such embodiments, the estimation of PDFs based on fitting CDFs to cumulative counts are also done for each subset separately.

In some embodiments, the memory controller estimates the PDFs as described above for each CW separately. In other embodiments, the memory controller estimates the PDFs for a given CW and uses the estimated PFDs for other CWs (e.g., in the same memory block). The memory controller may efficiently adjust the PDF of the given CW to be used for another CW.

The embodiments described above mainly consider modeling TVDs of memory cells using Gaussian PDFs. This, however, is not mandatory, and the disclosed embodiments are similarly applicable to other types of PDFs such as, for example, a Laplacian or a student-t distribution.

Although the embodiments described herein mainly address modeling TVDs for the purpose of improving soft decoding performance, the methods and systems described herein can also be used in other applications, such as in estimating optimal read thresholds, estimating conditions of the nonvolatile memory device, and the like.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A memory controller, comprising:
   an interface, configured to communicate with a plurality of memory cells storing respective Threshold Voltages (TVs); and
   a processor configured to:
   read a Code Word (CW) of an Error Correction Code (ECC) from a group of the memory cells using multiple read thresholds to produce multiple readouts, the read thresholds defining multiple zones of the TVs;
   identify a subgroup of the memory cells in the group associated with (i) a Read Voltage (RV) predetermined between adjacent first and second Programming Voltages (PVs), and (ii) multiple zones positioned about the RV;
   estimate for each of the multiple zones, based at least on the readouts, a first cumulative count of the memory cells in the subgroup corresponding to the first PV, and a second cumulative count of the memory cells in the subgroup corresponding to the second PV;

model first and second Probability Distributions Functions (PDFs) associated respectively with the memory cells in the subgroup programmed to the first and second PVs, based on at least some of the first and second cumulative counts;

calculate for the multiple zones respective reliability measures, based on the modeled first and second PDFs, and assign the reliability measures to bits of the CW; and decode the ECC of the CW by applying soft decoding to the assigned reliability measures.

2. The memory controller according to claim 1, wherein the processor is configured to apply an inverse cumulative function of a normalized PDF of the modeled first and second PDFs, to the first cumulative counts, to create a set of multiple equations in which parameters of the first PDF serve as unknown variables, and to estimate the parameters of the first PDF by solving the set of equations.

3. The memory controller according to claim 2, wherein the processor is configured to solve at least some of the equations in the set of equations, directly.

4. The memory controller according to claim 2, wherein the first PDF comprises a Gaussian PDF, and wherein the processor is configured to select two equations from among the set of equations, and to explicitly estimate a mean value parameter and a standard deviation parameter of the Gaussian PDF by solving the selected two equations.

5. The memory controller according to claim 2, wherein the processor is configured to solve the set of multiple equations by defining a Least Squares (LS) cost function that depends on the inverse cumulative function, applied to the first cumulative counts.

6. The memory controller according to claim 1, wherein the processor is configured to detect an anomaly in first cell counts from which the first cumulative counts are derived, the anomaly makes a solution of the set of equations invalid, or makes the set of equations unsolvable, and to process the first cell counts to resolve the anomaly.

7. The memory controller according to claim 1, wherein the processor is configured to divide the memory cells in the multiple zones into multiple subsets per zone depending on respective ranges of threshold voltages to which neighboring memory cells belong, to model PDF pairs based on cumulative cell counts per subset, and to calculate reliability levels per subset using the modeled PDF pairs.

8. The memory controller according to claim 1, wherein the processor is configured to identify in the group of the memory cells, indices corresponding to the memory cells in a given zone, to evaluate for the given zone first and second cell counts by respectively evaluating, in the identified indices of a base CW, a first number of '0' valued bits and a second number of '1' valued bits, and to calculate the first and second cumulative counts for the given zone based at least on the first and second cell counts.

9. A method for data storage, comprising:

in a memory controller that communicates with a plurality of memory cells storing respective Threshold Voltages (TVs), reading a Code Word (CW) of an Error Correction Code (ECC) from a group of the memory cells using multiple read thresholds to produce multiple readouts, the read thresholds defining multiple zones of the TVs;

identifying a subgroup of the memory cells in the associated with (i) group a Read Voltage (RV) predetermined between adjacent first and second Programming Voltages (PVs), and (ii) multiple zones positioned about the RV;

estimating for each of the multiple zones, based at least on the readouts, a first cumulative count of the memory cells in the subgroup corresponding to the first PV, and a second cumulative count of the memory cells in the subgroup corresponding to the second PV;

modeling first and second Probability Distribution Functions (PDFs) associated respectively with the memory cells in the subgroup programmed to the first and second PVs, based on at least some of the first and second cumulative counts;

calculating for the multiple zones respective reliability measures, based on the modeled first and second PDFs, and assign the reliability measures to bits of the CW; and decoding the ECC of the CW by applying soft decoding to the assigned reliability measures.

10. The method according to claim 9, and comprising, applying an inverse cumulative function of a normalized PDF of the modeled first and second PDFs, to the first cumulative counts, to create a set of multiple equations in which parameters of the first PDF serve as unknown variables, and estimating the parameters of the first PDF by solving the set of equations.

11. The method according to claim 10, wherein solving the set of equations comprises solving at least some of the equations in the set of equations, directly.

12. The method according to claim 10, wherein the first PDF comprises a Gaussian PDF, and wherein solving the set of equations comprises selecting two equations from among the set of equations, and explicitly estimating a mean value parameter and a standard deviation parameter of the Gaussian PDF by solving the selected two equations.

13. The method according to claim 10, wherein solving the set of equations comprises solving the set of multiple equations by defining a Least Squares (LS) cost function that depends on the inverse cumulative function, applied to the first cumulative counts.

14. The method according to claim 9, and comprising detecting an anomaly in first cell counts from which the first cumulative counts are derived, the anomaly makes a solution of the set of equations invalid, or makes the set of equations unsolvable, and processing the first cell counts to resolve the anomaly.

15. The method according to claim 9, and comprising, dividing the memory cells in the multiple zones into multiple subsets per zone depending on respective ranges of threshold voltages to which neighboring memory cells belong, modeling PDF pairs based on cumulative cell counts per subset, and calculating reliability levels per subset using the modeled PDF pairs.

16. The method according to claim 9, and comprising, identifying in the group of the memory cells, indices corresponding to the memory cells in a given zone, evaluating for the given zone first and second cell counts by respectively evaluating, in the identified indices of a base CW, a first number of '0' valued bits and a second number of '1' valued bits, and calculating the first and second cumulative counts for the given zone based at least on the first and second cell counts.

* * * * *